United States Patent
Mochida et al.

(10) Patent No.: US 6,383,463 B1
(45) Date of Patent: May 7, 2002

(54) EXHAUST GAS DENITRATION METHOD

(75) Inventors: Isao Mochida, Fukuoka; Akinori Yasutake; Toshihiko Setoguchi, both of Nagasaki; Norihisa Kobayashi, Tokyo; Hitoshi Nakamura, Nagasaki; Takahiro Kasuh; Masaaki Yoshikawa, both of Osaka, all of (JP)

(73) Assignees: Mitsubishi Heavy Industries, Ltd.; Osaka Gas Company Limited, both of (JP)

( * ) Notice: Subject to any disclaimer, the term of this patent is extended or adjusted under 35 U.S.C. 154(b) by 0 days.

(21) Appl. No.: 09/214,657

(22) PCT Filed: Jul. 10, 1997

(86) PCT No.: PCT/JP97/02388

§ 371 Date: Jan. 7, 1999

§ 102(e) Date: Jan. 7, 1999

(87) PCT Pub. No.: WO98/02234

PCT Pub. Date: Jan. 22, 1998

(30) Foreign Application Priority Data

Jul. 10, 1996 (JP) .............................................. 8-182009

(51) Int. Cl.[7] .......................... B01D 53/54; B01D 53/60
(52) U.S. Cl. ................................. 423/239.1; 423/239.2; 422/169; 422/172; 422/173; 422/177
(58) Field of Search ........................... 423/239.1, 239.2; 422/169, 172, 173, 177

(56) References Cited

U.S. PATENT DOCUMENTS 3,699,683 A  * 10/1972  Tourtellotte et al. ........... 60/274

FOREIGN PATENT DOCUMENTS

| CA | 2051552 | | 3/1993 | ........... B01D/53/04 |
|---|---|---|---|---|
| JP | 49-44969 | A | 4/1974 | |
| JP | 54004873 | * | 1/1979 | |
| JP | 55-8880 | A | 1/1980 | ........... B01D/53/36 |
| JP | 57-204221 | A | 12/1982 | ........... B01D/53/36 |
| JP | 405076772 | * | 3/1993 | |
| JP | 406079176 | * | 3/1994 | |

* cited by examiner

Primary Examiner—Steven P. Griffin
Assistant Examiner—Maribel Medina Sanabria
(74) Attorney, Agent, or Firm—Myers Bigel Sibley & Sajovec

(57) ABSTRACT

A process for the denitration of combustion exhaust gas from combustion equipment by passing the exhaust gas through an ammonia reduction denitrator, comprises providing a bypass having a low-temperature denitrator installed therein; while the temperature of the exhaust gas is not high enough to allow the ammonia reduction denitrator to function properly, as encountered immediately after starting the combustion equipment, passing the exhaust gas through the bypass to perform the denitration thereof by means of the low-temperature denitrator; when the ammonia reduction denitrator has come to function properly, closing the bypass to perform the denitration of the exhaust gas by means of the ammonia reduction denitrator; and regenerating a catalyst within said low-temperature denitrator while the by-pass is closed.

16 Claims, 3 Drawing Sheets

(a)

(b)

(a)

(b)

EXHAUST GAS DENITRATION METHOD

TECHNICAL FIELD

This invention relates to a process for the denitration of exhaust gases produced from various types of combustion equipment such as boilers, gas turbines, engines and combustion furnaces. More particularly, it relates to an exhaust gas denitration process which is suitable for denitration purposes while the exhaust gas has a low temperature (e.g., during the starting of combustion equipment) or in a section of the exhaust gas flow path where the exhaust gas has a low temperature.

BACKGROUND ART

An example of a conventional exhaust gas treating system is illustrated in FIG. 3. In the system of FIG. 3, a denitrator (ammonia reduction denitrator) 2 using a catalyst is installed at the outlet of a boiler 1 in order to remove nitrogen oxides ($NO_x$) present in the exhaust gas, and an air preheater 3 is installed at the outlet of denitrator 2 in order to lower the temperature of the exhaust gas to about 130° C. The exhaust gas having passed through air preheater 3 is dedusted in a dust collector 4, passed through a gas-gas heater 5 and then introduced into a desulfurizer 6 where sulfur oxides ($SO_x$) are removed therefrom. Thereafter, the exhaust gas is discharged into the atmosphere through a stack 7.

As a currently used means for the removal of nitrogen oxides present in exhaust gas, it is common practice to install a denitrator (or ammonia reduction denitrator) at the outlet of a boiler and treat the exhaust gas according to a selective catalytic reduction (SCR) process in which nitrogen oxides are decomposed into nitrogen and water vapor by using a catalyst comprising $V_2O_5$ supported on $TiO_2$ and a reducing agent comprising $NH_3$. On the basis of the properties of the catalyst, this denitration process requires a reaction temperature of 300 to 400° C. so as to allow the denitrator to function properly.

Meanwhile, the temperature of exhaust gas is low during the starting of a boiler or the like, and a period of time ranging from about 20 minutes to about 2 hours is required to attain 300° C. Accordingly, the aforesaid ammonia reduction denitrator fails to produce a sufficient denitration effect during this period. On the other hand, as a result of the recent tightening of environmental pollution controls, the nitrogen oxide concentration in exhaust gas must always be maintained at a low level. Consequently, it has become a problem to improve denitration efficiency while the exhaust gas has a low temperature as encountered during the starting of combustion equipment.

Moreover, it would be advantageous from the viewpoint of energy efficiency that highly efficient denitration can always be performed in a low-temperature section of an exhaust gas treating system.

Conventionally, many attempts have been made to perform denitration at low temperatures, but they have failed to achieve a satisfactorily high activity. After all, a reaction temperature of 300° C. or above is required to obtain a sufficient activity.

In view of the above-described existing state of the prior art, an object of the present invention is to provide a process for the denitration of combustion exhaust gas which can remove nitrogen oxides efficiently from exhaust gas having a low temperature and which is suitable for use as a countermeasure while the exhaust gas has a low temperature (e.g., during the starting of combustion equipment) or for the denitration of a low-temperature portion of the exhaust gas.

DISCLOSURE OF THE INVENTION

In order to accomplish the above object, the present invention provides the following denitration processes.

According to one embodiment of the present invention, there is provided a process for the denitration of combustion exhaust gas from combustion equipment by passing the exhaust gas through an ammonia reduction denitrator, which comprises providing the exhaust gas flow path with a bypass having a low-temperature denitrator installed therein, on the downstream side of the ammonia reduction denitrator; while the temperature of the exhaust gas is not high enough to allow the ammonia reduction denitrator to function properly, as encountered immediately after the starting of the combustion equipment, passing the exhaust gas through the bypass to perform the denitration thereof by means of the low-temperature denitrator; when the ammonia reduction denitrator has come to function properly, closing the bypass to perform the denitration of the exhaust gas by means of the ammonia reduction denitrator; and regenerating the catalyst within the low-temperature denitrator while the bypass is closed.

According to another embodiment of the present invention, there is provided a process for the denitration of combustion exhaust gas from a combustion apparatus, which installing a plurality of parallel-connected low-temperature denitrators in a section of the exhaust gas flow path where the temperature of the exhaust gas ranges from room temperature to 200° C.; and successively changing over the low-temperature denitrators in such a way that the denitration of the exhaust gas and the regeneration of the catalyst are alternately performed within each low-temperature denitrator.

In the process of the present invention, there are used one or more low-temperature denitrators which exhibit a high denitration activity in a relatively low temperature region at the initial stage of the reaction, but have a short duration of activity and which require a relatively long regeneration time. Thus, the following effects which are very valuable from a practical point of view can be achieved.

In an exhaust gas treating system incorporating a conventional ammonia reduction denitrator, a bypass is formed in the exhaust gas flow path and a low-temperature denitrator as described above is installed therein. Thus, satisfactory denitration can be performed even while the exhaust gas has a low temperature, for example, during the starting of a boiler.

Moreover, in an exhaust gas treating system in which a denitrator needs to be installed in a section having a low exhaust gas temperature, high denitration efficiency can be achieved by installing a plurality of parallel-connected low-temperature denitrators as described above.

BEST MODE FOR CARRYING OUT THE INVENTION

Figure 1:
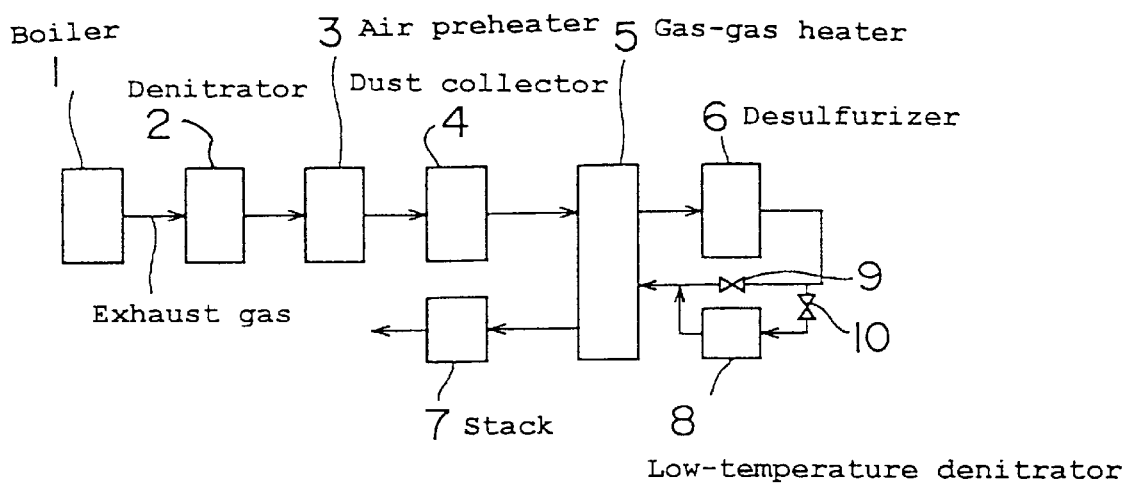
FIGS. 1(a) and 1(b) are block diagrams showing embodiments of the system construction for practicing the present invention.
Figure 1:
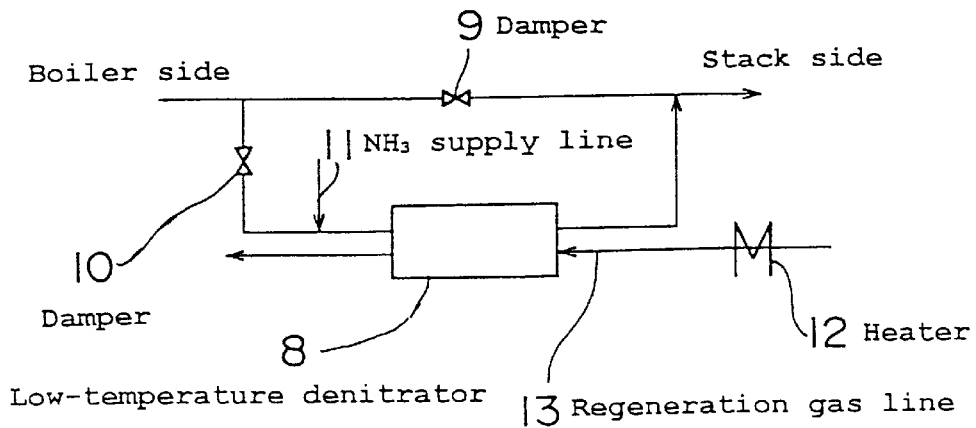

The low-temperature denitrator used in the process of the present invention is packed with a catalyst comprising at least one material selected from the group consisting of inorganic oxides such as titania, ceria, magnesia, boria, alumina, zirconia, yttria and copper oxide; metal ion-exchange zeolites such as copper ion-exchange Y-type zeolite, iron ion-exchange Y-type zeolite, cobalt ion-exchange Y-type zeolite, copper ion-exchange ZSM-5 and cobalt ion-exchange ZSM-5; metal-carrying polymers such as copper-carrying polyacrylonitrile; metal complexes such as copper polyphenylporphyrin and cobalt phthalocyanine; activated carbons such as coconut shell activated carbon and activated coke; and active carbon fibers such as those derived from polyacrylonitrile, phenol, cellulose and pitch. Among these materials, active carbon fibers are especially preferred because their activities last long. Moreover, the activities of activated carbons and active carbon fibers can be increased by heat treatment. For example, active carbon fibers may be heat-treated at a temperature of 600 to 1,200° C. in an atmosphere of an inert gas such as nitrogen, argon or helium.

The low-temperature denitrator packed with such a catalyst exhibits a sufficient denitration activity in a low-temperature region ranging from room temperature (e.g., around 5° C.) to 100° C., and retains a practically useful activity up to a temperature around 300° C. If $NH_3$ is added to exhaust gas in an amount at least equimolar to the nitrogen oxides present therein and the resulting exhaust gas is introduced into the low-temperature denitrator, a maximum of 200 ppm of nitrogen oxides can be reduced to 50 ppm or less.

Although the low-temperature denitrator used in the present invention exhibits a high denitration activity in a low-temperature region ranging from room temperature (e.g., around 5° C.) to 100° C., and retains a practically useful activity up to a temperature around 300° C., the duration of activity of the catalyst is relatively short and at most of the order of 6 hours. Moreover, a long time is required to regenerate the catalyst. That is, the regeneration time must usually be equal to or longer than the service time. Accordingly, the low-temperature denitrator is suitable for the denitration of exhaust gas while it has a low temperature, for example, during the starting of combustion equipment in which the service time is relatively short and a long regeneration time can be afforded. Moreover, since the low-temperature denitrator exhibits a high denitration activity in a low-temperature region, it is also suitable for the denitration of a low-temperature portion of exhaust gas. In this case, it is necessary to install a plurality of parallel-connected denitrators and regenerate them successively so that a sufficient regeneration time may be afforded.

The regeneration of the catalyst within the low-temperature denitrator or denitrators used in the present invention is performed by reducing nitrogen oxides on the catalyst by the addition of a reducing agent. As the reducing agent, there may used at least one compound selected from the group consisting of ammonia, aqueous urea, hydrocarbons, alcohols and the like. Specific examples of the hydrocarbons include hydrocarbons which vaporize easily at room temperature, such as methane, ethane, ethylene, propane and propylene. Among others, hydrocarbons of 3 carbon atoms, such as propane and propylene, are preferred. Specific examples of the alcohols include methanol and ethanol. Among others, methanol is preferred.

The temperature of the atmosphere in which the reduction reaction takes place as a result of the addition of a reducing agent may range from room temperature (inclusive of temperatures around 5° C.) to 150° C. The moisture content of the atmosphere in which the reduction reaction takes place may range from 0 to 3% by volume.

Figure 3:
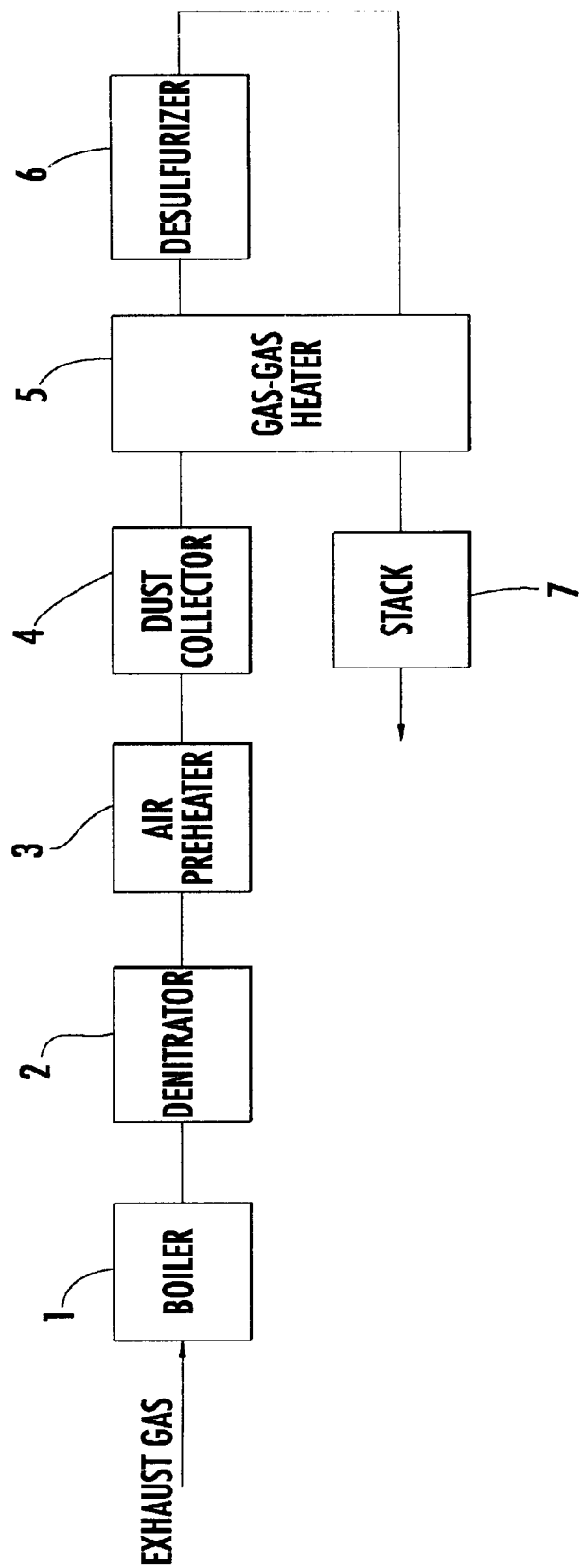
FIG. 3 is a block diagram illustrating an example of a conventional exhaust gas treating system.

One embodiment of the system construction for practicing the present invention is illustrated in FIG. 1. The system illustrated in FIG. 1 is constructed by applying a low-temperature denitrator in accordance with the present invention to a boiler exhaust gas treating system illustrated in FIG. 3.

During the starting of a boiler, the temperature of exhaust gas usually rises from a temperature almost equal to that of the outside air (i.e., room or ordinary temperature). In this situation, the $NO_x$ concentration in the exhaust gas generally increases gradually from almost zero to a steady value. During this course, an ordinary denitration catalyst for use in SCR acts only at temperatures higher than about 300° C. Consequently, for a low-temperature period ranging from about 20 minutes to about 2 hours, $NO_x$ will be discharged without being treated. In this embodiment, therefore, a bypass is formed on the downstream side of desulfurizer 6 as illustrated in FIG. 1(a), and a low-temperature denitrator 8 is installed therein as minutely shown in FIG. 1(b).

In the system of FIG. 1, during a period in which the temperature of exhaust gas is so low that denitration in a denitrator (or ammonia reduction denitrator) 2 is not fully performed (e.g., during the starting of the boiler), a damper 10 is opened and a damper 9 is closed. Thus, after $NH_3$ is added through an $NH_3$ supply line 11, the exhaust gas is introduced into low-temperature denitrator 8 and thereby denitrated. During steady-state operation in which the temperature of the exhaust gas exceeds 300° C., denitrator 2 functions properly and hence performs satisfactory denitration, so that the system is operated with damper 9 opened and damper 10 closed. By utilizing the spare time during which steady-state operation in performed, a regeneration gas (e.g., air) having been heated with a heater 12 as required is supplied through a regeneration gas line 13 to regenerate the catalyst within low-temperature denitrator 8.

Figure 2:
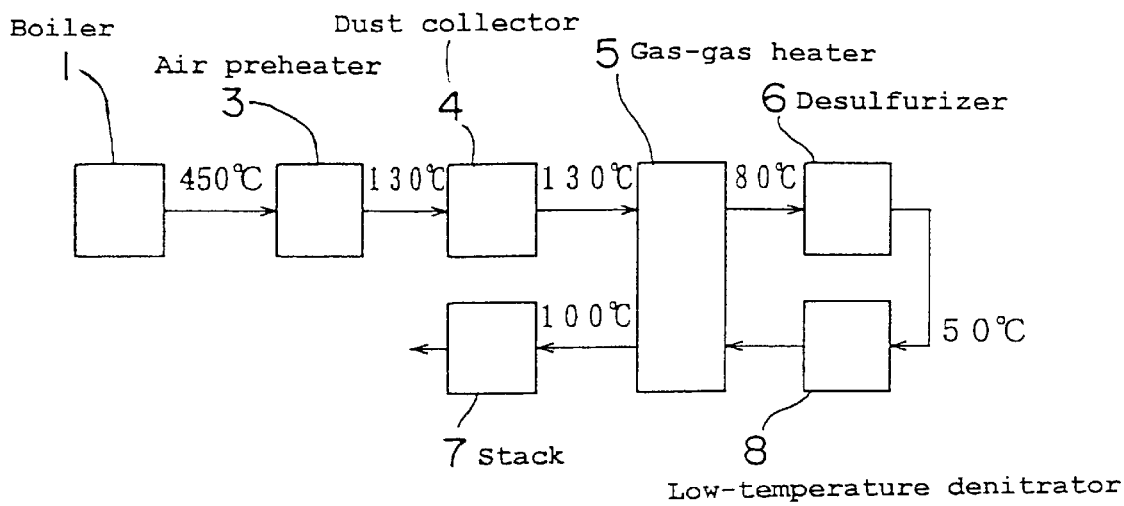
FIGS. 2(a) and 2(b) are block diagrams showing other embodiments of the system construction for practicing the present invention.
Figure 2:
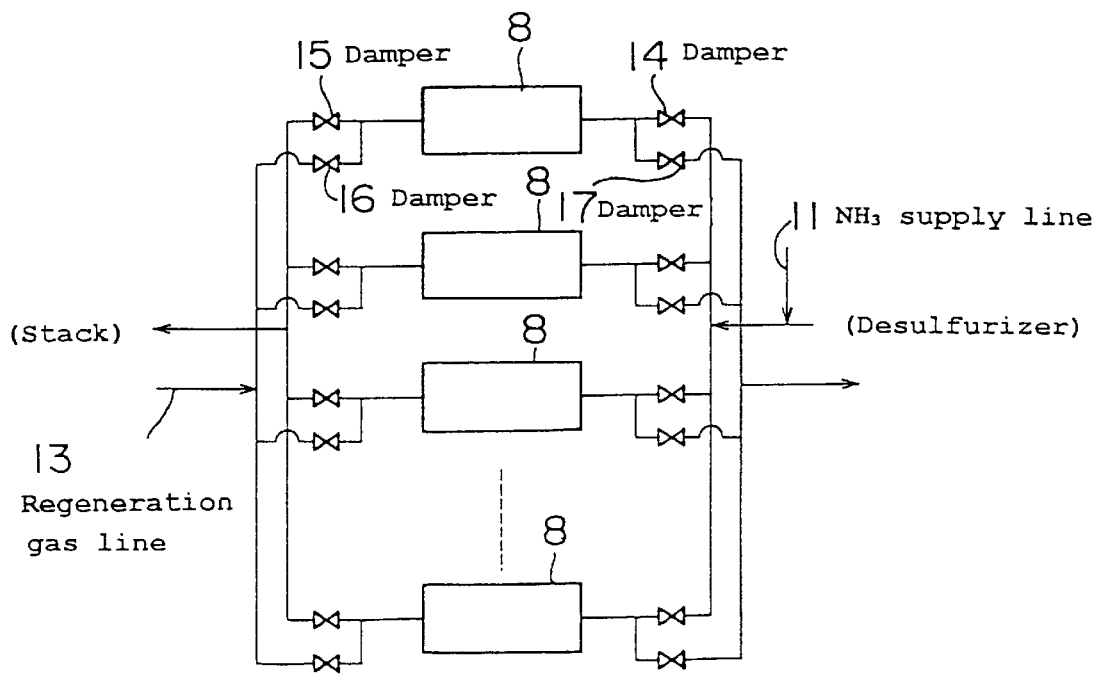

Another embodiment of the system construction for practicing the present invention is illustrated in FIG. 2. The system illustrated in FIG. 1 is constructed by using a low-temperature denitrator in accordance with the present invention as the main denitrator of a boiler exhaust gas treating system. As illustrated in FIG. 2(a), exhaust gas leaving a boiler 1 and having a temperature of about 450° C. passes through an air preheater 3, a dust collector 4, a gas-gas heater 5 and a desulfurizer 6 in that order, and reaches a low temperature of about 50° C. In this embodiment, a low-temperature denitrator 8 is installed on the downstream side of desulfurizer 6 as illustrated in FIG. 2(a).

More specifically, as illustrated in FIG. 2(b), a plurality of parallel-connected low-temperature denitrators 8 are installed in the exhaust gas flow path. Each of low-temperature denitrators 8 is provided with a damper 14 for the introduction of the exhaust gas, a damper 15 for the discharge of the denitrated exhaust gas, a damper 16 for the introduction of a regeneration gas, and a damper 17 for the discharge of the regeneration gas. A denitrator in which denitration is to be performed is operated with dampers 14 and 15 opened and dampers 16 and 17 cloned. When its activity is reduced, the denitrator is changed over to another denitrator which has been regenerated. The denitrator having a reduced activity is regenerated with dampers 14 and 15 closed and dampers 16 and 17 opened. During operation, the denitrators are successively changed over in this manner, so that denitration and regeneration are alternately performed in each denitrator. Thus, highly efficient denitration can be achieved and, moreover, a sufficient time required for regeneration can be secured.

The position at which the low-temperature denitrators are not particularly limited to those shown in FIGS. 1 and 2. In order to maintain the activity of the catalyst, the $SO_x$ concentration should preferably be as low as possible. Accordingly, in the case of exhaust gas containing $SO_x$, it is preferable to install the low-temperature denitrators downstream of the desulfurizer or the gas-gas heater.

The process of the present invention is more specifically explained with reference to the following examples.

In these examples, a tubular reactor packed with a catalyst was used, and denitration reaction tests were carried out with a sample gas prepared by mixing various gases. The nitrogen oxide concentration in the gas was measured with a nitrogen oxide analyzer manufactured by Yanagimoto Seisakusho, and the $NH_3$ concentration was measured by absorption into an aqueous solution of boric acid.

EXAMPLE 1

Using a sample (OG-8A-H850) of active carbon fiber OG-8A (manufactured by Osaka Cas Co., Ltd.) heat-treated at 850° C. in a stream of nitrogen for 1 hour as the catalyst, gas treating tests were carried out under the conditions shown in Table 1. Under these conditions, the degree of NO removal was 99% at the initial treatment, 98% after the first regeneration was performed, and 95% after this procedure (comprising 2 hours of denitration and 2 hours of regeneration) was repeated 15 times.

When the initial treating time was prolonged under these conditions, the degree of NO removal was maintained at 95% or above up to 6 hours. When this catalyst having been used for 6 hours was regenerated for 2, 4, 6 or 8 hours, the resulting degree of NO removal was 20, 50, 95 or 96%, respectively. After this procedure was repeated 10 times, the resulting degree of NO removal wag 0, 10, 93 or 95%, respectively. Thus, it was found that the regeneration time must be equal to or longer than the treating time.

TABLE 1

Test Conditions in Example 1

| Item | Test conditions etc. |
|---|---|
| Type and amount of catalyst used | OG-8A-H850, 5 g (50 cc) |
| Flow rate of gas to be treated | 200 cc/min (SV value, 240 h$^{-1}$) |
| Composition of gas to be treated | NO: 200 ppm<br>$NH_3$: 200 ppm<br>$O_2$: 4%<br>$H_2O$: 2%<br>$N_2$: Balance |
| Temperature of gas to be treated | 25° C. |
| Treating time | 2 hours |
| Flow rate of regeneration gas | 200 cc/min |
| Composition of regeneration gas | $O_2$: 18%<br>$H_2O$: 2%<br>$N_2$: Balance |
| Regeneration temperature | 25° C. |
| Regeneration time | 2 hours |

EXAMPLE 2

When the same tests as in Example 1 were carried out by changing the temperature of the gas to be treated to 100° C., it was found that a similar activity was exhibited by using a regeneration gas temperature of 200° C. Specifically, when the catalyst was used to treat the gas at 100° C. for 6 hours, and then regenerated with the regeneration gas having a temperature of 200° C. for 2, 4, 6 or 8 hours, the resulting degree of NO removal was 20, 50, 92 or 94%, respectively. After this procedure was repeated 10 times, the resulting degree of NO removal was 0, 10, 90 or 93%, respectively.

On the other hand, when the catalyst was regenerated with air containing 200 ppm $NH_3$ and having a temperature of 25° C., a regeneration time of 10 hours was required for the treating time of 6 hours. Moreover, when the catalyst was regenerated with air containing 200 ppm $NH_3$ and having a temperature of 200° C., a similar activity was exhibited at a regeneration time of 4 hours.

EXAMPLE 3

Using copper oxide as the catalyst, gas treating tests were carried out under the conditions shown in Table 2. The copper oxide used was prepared as follows: Commercially available copper nitrate reagent was dissolved in distilled water to form a 1M aqueous solution thereof, and 3N aqueous ammonia was slowly added thereto so as to precipitate copper hydroxide. After the resulting precipitate was filtered off, washed, and dried at 110° C. for 24 hours, it was placed in an electric furnace and fired in flowing air at 65° C. for 2 hours to convert it into CuO. The CuO so formed was adjusted to 16–80 mesh and used as a sample.

TABLE 2

Test Conditions in Example 3

| Item | Test conditions etc. |
|---|---|
| Type and amount of catalyst used | CuO (prepared), 10 g (10 cc) |
| Flow rate of gas to be treated | 100 cc/min (SV value, 600 h$^{-1}$) |
| Composition of gas to be treated | NO: 100 ppm<br>$NH_3$: 100 ppm<br>$CO_2$: 10%<br>$O_2$: 5%<br>$H_2O$: 2%<br>$N_2$: Balance |
| Temperature of gas to be treated | 70° C. |
| Treating time | 1 hour |
| Flow rate of regeneration gas | 100 cc/min |
| Composition of regeneration gas | $O_2$: 18%<br>$H_2O$: 2%<br>$N_2$: Balance |
| Regeneration temperature | 30° C. |
| Regeneration time | 12 hours |

In this example, the degree of NO removal was 99% at the initial treatment, and 90% after the first regeneration was performed. When this procedure (comprising 1 hour of denitration and 12 hours of regeneration) was repeated 18 times, the degree of NO removal was 90±2%. When heated air was used for the purpose of regeneration, the regeneration time was reduced to 2 hours at a regeneration gas temperature of 300° C.

The air having been used for the purpose of regeneration contains NO and is hence used as combustion air for a boiler.

EXAMPLE 4

Using Cu ion-exchange Y-type zeolite as the catalyst, the same tests as in Example 3 were carried out. The catalyst used was prepared as follows: Y-type zeolite PCV-100 (manufactured by PQ Corp., U.S.A.) wag dispersed in a 1M aqueous solution of copper nitrate. The resulting suspension was adjusted to pH 8.5 with aqueous ammonia and stirred for 3 hours. After the zeolite was filtered off, washed, and dried at 110° C. for 24 hours, it was placed in an electric furnace and fired in flowing air at 650° C. for 1 hour to convert it into Cu ion-exchange Y-type zeolite (Cu-Y).

When gas treatments were carried out in the same manner as in Example 3 by using this catalyst, the degree of NO removal was 95% at the initial treatment, and 92% after the first regeneration was performed. When this procedure (comprising 1 hour of denitration and 12 hours of regeneration) was repeated 15 times, the degree of NO removal was 90±2%. When air containing 100 ppm $NH_3$ was used for the purpose of regeneration, the regeneration time was not changed, but the degree of NO removal after regeneration was improved by 2–3%. This indicates that the presence of $NH_3$ during regeneration causes the denitration reaction of residual NO to proceed a little further. Moreover, when a combination of $NH_3$ addition and heating was used (i.e., air containing 100 ppm $NH_3$ and having a temperature of 300° C. was used, the regeneration time was reduced to 1.5 hours. However, the degree of NO removal after regeneration showed no change.

EXAMPLE 5

When Cu-carrying polyacrylonitrile, Cu polyphenylporphyrin or Cu polyphthalocyanine was used as the catalyst, substantially the same results as described in Example 1 were obtained.

What is claimed is:

1. A process for the denitration of combustion exhaust gas from combustion equipment by passing the exhaust gas through a low-temperature ammonia reduction denitrator, said process comprising:

passing an exhaust gas exiting from a boiler through an air preheater to reduce the temperature of the exhaust gas; then passing the exhaust gas through a dust collector; then passing the exhaust gas through a gas-gas heater wherein the temperature of the exhaust gas is further lowered; then passing the exhaust gas through a desulfurizer; then passing the exhaust gas through at least one low-temperature denitrator; and then passing the denitrated exhaust gas through said gas-gas heater to increase the temperature of the gas.

2. The process according to claim 1, wherein the at least one low-temperature denitrator comprises a catalyst.

3. The process according to claim 2, wherein the catalyst is selected from the group consisting of inorganic oxides, metal ion-exchange zeolites, metal-carrying polymers, metal complexes, activated carbons, active carbon fibers, and combinations thereof.

4. The process according to claim 2, wherein the catalyst comprises an active carbon fiber derived from pitch, polyacrylonitrile, cellulose, or phenol and heat-treated at a temperature of 600° C. to 1200° C. under an atmosphere of inert gas selected from the group consisting of nitrogen, argon, and helium.

5. The process according to claim 1, wherein the at least one low-temperature denitrator comprises a plurality of parallel-connected low-temperature denitrators in a section of exhaust gas flow path where the temperature of the exhaust gas ranges from room temperature to 200° C.; and successively changing over said low-temperature denitrators in such a way that the denitration of the exhaust gas and regeneration of the catalyst are alternatively performed within each low-temperature denitrator.

6. The process according to claim 5, wherein the denitration of the exhaust gas and the regeneration of the catalyst are performed by reducing nitrogen oxides on the catalyst by the addition of a reducing agent.

7. The process according to claim 6, wherein the reducing agent comprises at least one compound selected from the group consisting of ammonia, aqueous urea, hydrocarbons, and alcohols.

8. The process according to claim 7, wherein the temperature of the atmosphere in which the reduction reaction takes place as a result of the addition of a reduction agent ranges from room temperature to 150° C. and the moisture content of the atmosphere in which the reduction reaction takes place ranges from 0 to 3 percent by volume.

9. A system for the denitration of exhaust gas from combustion equipment, said system comprising:

an air preheater;

a dust collector located downstream of and in fluid communication with said air preheater;

a gas-gas heater located downstream of and in fluid communication with said dust collector;

a desulfurizer located downstream of and in fluid communication with said gas-gas heater; and at least one low-temperature denitrator located downstream of and in fluid communication with said desulfurizer.

10. The system according to claim 9, wherein the at least one low-temperature denitrator comprises a catalyst.

11. The system according to claim 10, wherein the catalyst is selected from the group consisting of inorganic oxides, metal ion-exchange zeolites, metal-carrying polymers, metal complexes, activated carbons, active carbon fibers, and combinations thereof.

12. The system according to claim 10, wherein the catalyst comprises an active carbon fiber derived from pitch, polyacrylonitrile, cellulose, or phenol and heat-treated at a temperature of 600° C. to 1200° C. under an atmosphere of inert gas selected from the group consisting of nitrogen, argon, and helium.

13. The system according to claim 9, wherein the at least one low-temperature denitrator comprises, a plurality of parallel-connected low-temperature denitrators in a section of exhaust gas flow path where the temperature of the exhaust gas ranges from room temperature to 200° C.; and successively changing over said low-temperature denitrators in such a way that the denitration of the exhaust gas and regeneration of the catalyst are alternatively performed within each low-temperature denitrator.

14. The system according to claim 13, wherein the denitration of the exhaust gas and the regeneration of the catalyst are performed by reducing nitrogen oxides on the catalyst by the addition of a reducing agent.

15. The system according to claim 14, wherein the reducing agent comprises at least one compound selected from the group consisting of ammonia, aqueous urea, hydrocarbons, and alcohols.

16. The system according to claim 14, wherein the temperature of the atmosphere in which the reduction reaction takes place as a result of the addition of a reduction agent ranges from room temperature to 150° C. and the moisture content of the atmosphere in which the reduction reaction takes place ranges from 0 to 3 percent by volume.

* * * * *